(12) United States Patent
Suh et al.

(10) Patent No.: US 10,276,865 B2
(45) Date of Patent: Apr. 30, 2019

(54) NEGATIVE ACTIVE MATERIAL FOR SECONDARY BATTERY, NEGATIVE ELECTRODE AND LITHIUM BATTERY EACH INCLUDING NEGATIVE ACTIVE MATERIAL, AND METHOD OF PREPARING NEGATIVE ACTIVE MATERIAL

(71) Applicants: Samsung SDI Co., Ltd., Yongin-si, Gyeonggi-do (KR); MK ELECTRON CO,. LTD., Yongin-si, Gyeonggi-do (KR)

(72) Inventors: Soonsung Suh, Yongin-si (KR); Jaehyuk Kim, Yongin-si (KR); Jongsoo Cho, Seoul (KR); Soonho Hong, Yongin-si (KR); Chansoon Kang, Seoul (KR); Kyuhwan Oh, Seoul (KR)

(73) Assignees: Samsung SDI Co., Ltd., Gyeonggi-Do (KR); MK Electron Co., Ltd., Gyeonggi-Do (KR); SNU R&DB Foundation, Seoul National University, Seoul (KR)

( * ) Notice: Subject to any disclaimer, the term of this patent is extended or adjusted under 35 U.S.C. 154(b) by 309 days.

(21) Appl. No.: 14/931,748

(22) Filed: Nov. 3, 2015

(65) Prior Publication Data
US 2016/0141614 A1 May 19, 2016

(30) Foreign Application Priority Data
Nov. 19, 2014 (KR) .................. 10-2014-0161636

(51) Int. Cl.
*H01M 4/38* (2006.01)
*H01M 4/36* (2006.01)
(Continued)

(52) U.S. Cl.
CPC .......... *H01M 4/386* (2013.01); *H01M 4/364* (2013.01); *H01M 4/134* (2013.01); *H01M 10/0525* (2013.01)

(58) Field of Classification Search
CPC ...... H01M 4/386; H01M 4/364; H01M 4/134; H01M 10/0525
See application file for complete search history.

(56) References Cited

U.S. PATENT DOCUMENTS

2010/0301276 A1  12/2010  Lee et al.
2013/0196233 A1  8/2013  Moon et al.
(Continued)

FOREIGN PATENT DOCUMENTS

JP  2002-351637 A  12/2002
JP  2011-34836 A   2/2011
(Continued)

OTHER PUBLICATIONS

Korean Office Action dated Dec. 14, 2015 for Korean Patent Application No. KR 10-2014-0161636, from which subject U.S. Appl. No. 14/931,748 claims priority, and which cites the above-identified references numbered 3-5.
(Continued)

*Primary Examiner* — Peter F Godenschwager
*Assistant Examiner* — Andrew J. Oyer
(74) *Attorney, Agent, or Firm* — Knobbe, Martens, Olson & Bear, LLP

(57) ABSTRACT

Provided is a negative active material for a secondary battery which provides high capacity, high efficiency charging-discharging characteristics. The negative active material includes: a silicon single phase; and a silicon-metal alloy phase interfaced with the silicon single phase and surrounding the silicon single phase, wherein an X-ray diffraction spectrum of the negative active material has first and second
(Continued)

peaks that are originated from the silicon-metal alloy phase, and the first peak is located at 49.1+/−0.5 degrees (°) and the second peak is located at 38.0+/−0.5 degrees (°), and a diffraction intensity of the first peak is 2 or less times that of to the second peak.

11 Claims, 12 Drawing Sheets

(51) Int. Cl.
*H01M 4/134* (2010.01)
*H01M 10/0525* (2010.01)

(56) References Cited

U.S. PATENT DOCUMENTS

| | | | |
|---|---|---|---|
| 2013/0316238 A1 | 11/2013 | Nishimura et al. | |
| 2014/0212694 A1 | 7/2014 | Park et al. | |
| 2014/0332716 A1* | 11/2014 | Hong | H01M 4/386 252/182.1 |

FOREIGN PATENT DOCUMENTS

| | | |
|---|---|---|
| JP | 2013-161786 A | 8/2013 |
| KR | 10-0698361 B1 | 3/2007 |
| KR | 10-2009-0099922 A | 9/2009 |
| KR | 10-2010-0060613 A | 6/2010 |
| KR | 10-2010-0127990 A | 12/2010 |
| KR | 10-2013-0088483 A | 8/2013 |
| KR | 10-2013-0106402 A | 9/2013 |
| KR | 10-2014-0075479 A | 6/2014 |
| KR | 10-2014-0096915 A | 8/2014 |
| WO | WO-2013115473 A1 * | 8/2013 ............ H01M 4/386 |

OTHER PUBLICATIONS

Gao et al., "The Thermal Stability of Nanocrystalline Fe—Si—Nb Prepared by Mechanical Alloying", *NanoStructured Materials*, vol. 2, 1993, pp. 231-240.

Korean Office Action dated Apr. 25, 2017 for Korean Patent Application No. KR 10-2016-0136444, which cites the above-identified reference numbered 2, and which is related to Korean Patent Application No. KR 10-2014-0161636, from which priority is claimed by subject U.S. Appl. No. 14/931,748.

Korean Office Action dated Nov. 24, 2017 for Korean Patent Application No. KR 10-2016-0136444, which cites the above-identified references numbered 2 and 4, and which is related to Korean Patent Application No. KR 10-2014-0161636, from which priority is claimed by subject U.S. Appl. No. 14/931,748.

* cited by examiner

NEGATIVE ACTIVE MATERIAL FOR SECONDARY BATTERY, NEGATIVE ELECTRODE AND LITHIUM BATTERY EACH INCLUDING NEGATIVE ACTIVE MATERIAL, AND METHOD OF PREPARING NEGATIVE ACTIVE MATERIAL

RELATED APPLICATION

Any and all applications for which a foreign or domestic priority claim is identified in the Application Data Sheet as filed with the present application are hereby incorporated by reference under 37 CFR 1.57. This application claims the benefit of Korean Patent Application No. 10-2014-0161636, filed on Nov. 19, 2014, in the Korean Intellectual Property Office, the disclosure of which is incorporated herein in its entirety by reference.

BACKGROUND

Field

One or more embodiments of the present disclosure relates to negative active materials for a secondary battery, negative electrodes and lithium batteries each including the negative active materials, and methods of preparing the negative active materials.

Description of the Related Technology

Lithium secondary batteries are used in various applications including power sources for portable electronic products, such as mobile phones or laptop computers, as well as medium- and large-sized power sources, such as hybrid electric vehicles (HEV), or plug-in HEVs. Due to the wide application range and an increasing demand therefore, the outer shape and size of batteries are constantly changing, and as a result higher capacity, longer lifespan, and higher stability is desired compared to the small batteries.

In lithium secondary batteries, materials that enable intercalation and deintercalation of lithium ions are used in a negative electrode and a positive electrode, a porous separator is disposed between the positive electrode and the negative electrode, and then, an electrolytic solution is added thereto to complete forming the lithium secondary batteries, wherein, at the negative electrode and the positive electrode, oxidation and reduction occurs due to intercalation and deintercalation of lithium ions, thereby generating or consuming electricity.

Graphite, which is widely used as a negative active material for a secondary lithium battery, has a layered structure, which is very suitable for intercalation and deintercalation of lithium ions. Although graphite has, in theory, a capacity of 372 mAh/g, alternative electrodes to graphite are required due to the ever increasing demand for high-capacity lithium batteries. In this regard, research activity to identify a high-capacity negative active material and ways to commercialize an electrode active material that forms an electrochemical alloy of lithium ions with metals such as silicon (Si), tin (Sn), antimony (Sb), or aluminum (Al), is actively being performed. However, when silicon (Si), tin (Sn), antimony (Sb), and aluminum (Al) are charged or discharged due to the electrochemical alloy formation with lithium, a volumetric increase or decrease may occur, and the volumetric change due to repeated charging and discharging may deteriorate cyclic characteristics of an electrode including Si, Sn, Sb, and Al as an active material. Also, the volumetric change may cause cracks in the surface of an electrode active material, and when the cracks are continually formed, the surface of an electrode is fragmented, further deteriorating cyclic characteristics thereof.

SUMMARY

Some embodiments provide negative active materials for a secondary battery which are capable of providing high capacity, high efficiency charging and discharging characteristics.

Exemplary embodiments provide a method of preparing the same.

Additional embodiments will be set forth in part in the description which follows and, in part, will be apparent from the description, or may be learned by practice of the presented embodiments.

According to one or more exemplary embodiments, a negative active material includes: a silicon single phase; and a silicon-metal alloy phase interfaced with the silicon single phase and surrounding the silicon single phase, wherein the negative active material includes 0 to 30 at % of iron (Fe), 0 to 10 at % of a first addition element, and 60 to 90 at % of silicon, the first addition element is selected from boron, carbon, phosphorous, titanium, chromium, manganese, cobalt, nickel, copper, zinc, zirconium, niobium, molybdenum, and tin, an X-ray diffraction spectrum of the negative active material has first and second peaks originated from the silicon-metal alloy phase, and the first peak is located at 49.1+/−0.5 degrees (°) and the second peak is located at 38.0+/−0.5 degrees (°), and a ratio of a diffraction intensity of the first peak to a diffraction intensity of the second peak is 2 or less.

In exemplary embodiments, the first peak of the silicon-metal alloy phase is a diffraction peak corresponding to a crystallographic (102) face of a ferrosilicon ($FeSi_2$) phase, and the second peak of the silicon-metal alloy phase is a diffraction peak corresponding to a crystallographic (101) face of the ferrosilicon ($FeSi_2$) phase.

In exemplary embodiments, a diffraction intensity of the first peak may be 1.8 to 1.9 times that of the second peak.

In exemplary embodiments, the X-ray diffraction spectrum of the negative active material may further have a third peak originated from the silicon-metal alloy phase, and the third peak may be located at 17.3+/−0.5 degrees (°), and the third peak may be a diffraction peak corresponding to a crystallographic (001) face of a ferrosilicon ($FeSi_2$) phase.

In exemplary embodiments, the X-ray diffraction spectrum of the negative active material may further have a fourth peak corresponding to a crystallographic (111) face of the silicon single phase, wherein the fourth peak is located at 28.5+/−0.5 degrees (°), and the silicon single phase may have an average crystal particle diameter of 50 nanometers (nm) or less.

In exemplary embodiments, a ratio of an atomic molar fraction of silicon to the sum of an atomic molar fraction of the iron and an atomic molar fraction of the first addition element may be in a range of 3.5 to 4.5.

In exemplary embodiments, the negative active material may include 10 to 30 at % of iron (Fe), 0.1 to 10 at % of the first addition element, and 70 to 90 at % of silicon.

In exemplary embodiments, the first addition element may be selected from Mn, Cr, and Al.

In exemplary embodiments, the negative active material may have a specific resistance of 0.2 Ωcm or less when a compressive load of 4 to 20 kN is applied thereto.

In exemplary embodiments, an electrode including the negative active material may volumetrically expand to 50% or less of an initial electrode plate thickness, after one charging and after repeated charging and discharging cycles.

According to one or more exemplary embodiments, a method of preparing a negative active material includes: providing a mixture including a first powder containing silicon, a second powder containing iron, and a third powder containing a first addition element; and milling and refining the mixture by mechanical alloying to form a negative active material comprising silicon, iron, and the first addition element, wherein the first addition element comprises an element selected from boron, carbon, phosphorus, titanium, chromium, manganese, cobalt, nickel, copper, zinc, zirconium, niobium, molybdenum, and tin, the negative active material formed by the mechanical alloying has an average crystal particle diameter of 50 nm or less, and comprises a silicon single phase and a silicon-metal alloy phase interfaced with the silicon single phase and surrounding the silicon single phase.

In exemplary embodiments, the mechanical alloying may be performed by any one selected from vertical attrition milling, horizontal attrition milling, ball milling, planetary milling, and Spex milling.

In exemplary embodiments, the providing of the mixture may include providing the first powder, the second powder, and the third powder in a powder form into a milling container.

In exemplary embodiments, the providing of the mixture may include providing a third powder and an intermediate powder containing silicon, iron, and the first addition element which is formed by melting and cooling the first powder, the second powder, and the third powder into a milling container.

In exemplary embodiments, the providing of the mixture may include providing an intermediate powder containing silicon and iron which is formed by melting and cooling the first powder and the second powder, and the third powder into a milling container.

In exemplary embodiments, the providing of the mixture may include providing an intermediate powder including silicon, iron, and the first addition element which are formed by melting and cooling the first powder, the second powder, and the third powder into a milling container.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1:
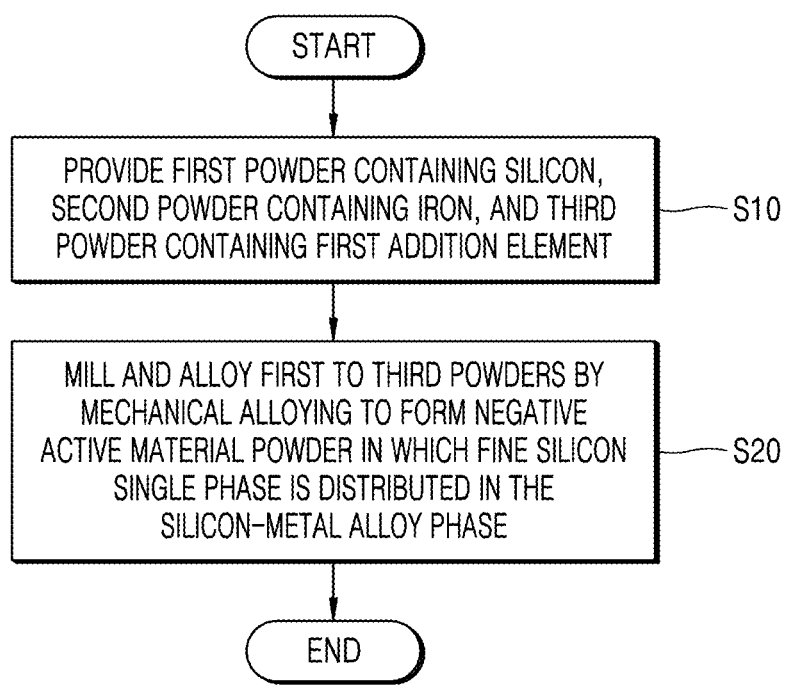
FIG. 1 shows a flowchart illustrating a method of preparing a negative active material, according to exemplary embodiments.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which exemplary embodiments are shown. The disclosure may, however, be embodied in many different forms and should not be construed as being limited to the embodiments set forth herein; rather, these embodiments are provided so that this disclosure will be thorough and complete, and will fully convey the concept to those of ordinary skill in the art. As used herein, the term "and/or" includes any and all combinations of one or more of the associated listed items. Through the specification, like reference numerals denote like elements. Furthermore, in the drawings, various elements and regions are schematically illustrated. Accordingly, the disclosure is not limited to the relative sizes and intervals illustrated in the attached drawings. In embodiments, at % (atomic percent) indicates a percentage of the number of atoms of a corresponding component in the total number of atoms constituting an alloy.

A negative active material for a secondary battery according to exemplary embodiments includes a silicon single phase, and a silicon-metal alloy phase interfaced with the silicon single phase and surrounding the silicon single phase. The negative active material includes 0 to 30 at % of iron (Fe), 0 to 10 at % of a first addition element, and 60 to 90 at % of silicon, and the first addition element is selected from boron, carbon, phosphorous, titanium, chromium, manganese, cobalt, nickel, copper, zinc, zirconium, niobium, molybdenum, and tin. An X-ray diffraction spectrum of the negative active material has first and second peaks that are originated from the silicon-metal alloy phase, and the first peak is located at 49.1+/−0.5 degrees (°) and the second peak is located at 38.0+/−0.5 degrees (°). A ratio of a diffraction intensity of the first peak to a diffraction intensity of the second peak is 2 or less. The first peak of the silicon-metal alloy phase is a diffraction peak corresponding to a crystallographic (102) face of a ferrosilicon ($FeSi_2$) phase, and the second peak of the silicon-metal alloy phase is a diffraction peak corresponding to a crystallographic (101) face of the $FeSi_2$ phase. In some embodiments, a ratio of a diffraction intensity of the first peak to a diffraction intensity of the second peak may be in a range from about 1.8 to about 1.9.

In exemplary embodiments, relative diffraction intensities of the first and second peaks of the silicon-metal alloy phase are associated with a micro/nano structure of the negative active material. For example, in a negative active material that includes the first addition element, the silicon single phase may be homogeneously distributed in fine sizes. Also, since the first addition element is included in the silicon-metal alloy phase, stress may affect the lattice of a $FeSi_2$ crystal structure resulting in distortion. In addition, due to the first addition element, the lattice of the silicon-metal alloy phase may also distort (shrink or expand). Accordingly, the intensity of the first peak may substantially decrease, and in comparison the intensity of the second peak may decrease less relative to that of the first peak. Due to the change in the micro/nano structure of the silicon-metal alloy phase caused by the first addition element, volumetric expansion during charging and discharging phases may be effectively buffered. Accordingly, the negative active material may have improved electrochemical characteristics (for example, discharge capacity or cycle performance). The relationship between the micro/nano structure of the negative active material and relative diffraction intensities of the first and second peaks will be described in detail with reference to FIG. 4.

In exemplary embodiments, the X-ray diffraction spectrum of the negative active material may further have a third peak that is originated from the silicon-metal alloy phase, and the third peak may be located at 17.3+/−0.5 degrees (°). The third peak may be a diffraction peak corresponding to a crystallographic (001) face of the $FeSi_2$ phase.

In exemplary embodiments, the X-ray diffraction spectrum of the negative active material may further have a fourth peak corresponding to a crystallographic (111) face of the silicon single phase, and the fourth peak may be located at 28.5+/−0.5 degrees (°). The silicon single phase may have an average crystal particle diameter of 50 nanometers (nm) or less. When the silicon single phase is homogeneously distributed in fine sizes inside the silicon-metal alloy phase, the silicon-metal alloy, which is a matrix, may act as a buffer layer that buffers a volumetric change of the silicon single phase caused by intercalation/deintercalation of lithium particles during charging and discharging, and thus prevent the cracks and damages of the negative active material due to the volumetric change of the silicon single phase. As a result, a lithium battery using the negative active material may have excellent lifespan characteristics.

In exemplary embodiments, a ratio of an atomic molar fraction of silicon to the sum of an atomic molar fraction of the iron and an atomic molar fraction of the first addition element may be in a range of 3.5 to 4.5. Herein, the term "atomic molar fraction" refers to a value obtained by dividing the atomic number of a component by the sum of atomic numbers of all components. For example, when the negative active material includes $Si_{80}Fe_{18}Mn_2$, a ratio of an atomic molar fraction of silicon to the sum of atomic molar fractions of Fe and Mn, which is the first addition element, is calculated as follows: 0.8/(0.18+0.02)=4. When the ratio of an atomic molar fraction of silicon to the sum of an atomic molar fraction of the iron and an atomic molar fraction of the first addition element is within this range, a diffraction intensity of the first peak may be 2 or less times that of the second peak, and lifespan characteristics of a lithium battery including the negative active material may be improved.

In exemplary embodiments, the negative active material may include 10 to 30 at % of iron (Fe), 0.1 to 10 at % of the first addition element, and 70 to 90 at % of silicon.

In exemplary embodiments, the negative active material may include 10 to 20 at % of iron (Fe), 0.1 to 10 at % of the first addition element, and 70 to 90 at % of silicon.

In exemplary embodiments, the negative active material may include 10 to 20 at % of iron (Fe), 0.1 to 10 at % of the first addition element and 80 to 90 at % of silicon.

In exemplary embodiments, the first addition element may be selected from Mn, Cr, and Al.

In exemplary embodiments, the negative active material may have a specific resistance of 0.2 Ωcm or less when a compressive load of 4 to 20 kN is applied thereto. For example, since the silicon single phase is dispersed in fine sizes in the silicon-metal alloy phase in the negative active material and a lattice constant of the silicon single phase is about 50 nanometers or less, the negative active material may have low specific resistance and excellent electrical conductivity. A secondary battery using such a negative active material may undergo a decrease in voltage drop, for example IR drop, caused by electrode resistance or may have high capacity and high energy density due to the decrease in an amount of a conductive material to be added thereto.

In preparing a negative active material for a secondary battery according to exemplary embodiments, silicon powder is milled and refined by mechanical alloying so that the silicon single phase may be uniformly distributed in fine sizes inside the silicon-metal alloy phase.

In exemplary embodiments, a mixture including a first powder containing silicon, a second powder containing iron, and a third powder containing a first addition element is provided, and then, the mixture is milled and refined by mechanical alloying to form a negative active material containing silicon, iron, and the first addition element, wherein the first addition element may be at least one selected from the group consisting of boron, carbon, phosphorus, titanium, chromium, manganese, cobalt, nickel, copper, zinc, zirconium, niobium, molybdenum, and tin. In this regard, due to the milling and refining of the mixture by mechanical alloying, the formed negative active material may have a silicon single phase having an average crystal particle diameter of 50 nm or less and a silicon-metal alloy phase surrounding the silicon single phase.

The mechanical alloying may be performed by dry milling and alloying the powder mixture containing the first powder, the second powder, and the third powder to prepare a negative active material in which a fine silicon single phase is distributed. The obtained negative active material has a small specific resistance.

In exemplary embodiments, the first powder, the second powder, and the third powder are milled and alloyed by mechanical alloying using a milling apparatus, such as vertical attrition milling, horizontal attrition milling, ball milling, planetary milling, or Spex milling. In particular, the first powder, the second powder, and the third powder are provided in the form of powder into a milling container. As a result, a rapid cooling method, in which an active material is melted at a high temperature and then rapidly cooled to form a primary alloy (for example, ribbon alloy), and the primary alloy is milled to form negative active material powder, may not be necessary, and thus a plurality of processes may be skipped and manufacturing costs may be reduced.

However, exemplary embodiments may use the rapid cooling method. For example, the mixture may be provided such that the first powder containing silicon and the second powder containing iron are melted and cooled to form an intermediate powder containing silicon and iron, and then, the intermediate powder is mixed with the third powder containing the first addition element. Then, the mixture is loaded into a milling container.

In some embodiments, the mixture may be provided such that an intermediate powder containing silicon, iron, and the first addition element prepared by melting and cooling the first powder, the second powder, and the third powder is loaded into a milling container.

Hereinafter, a method of preparing a negative active material, according to exemplary embodiments, will be described in detail.

FIG. 1 shows a flowchart illustrating a method of preparing a negative active material, according to exemplary embodiments.

Referring to FIG. 1, a first powder containing silicon, a second powder containing iron, and a third powder containing a first addition element may be provided (process S10). The first addition element may be at least one element selected from boron, carbon, phosphorus, titanium, chromium, manganese, cobalt, nickel, copper, zinc, zirconium, niobium, molybdenum, and tin.

The weights of the first to third powders may be measured such that a negative active material includes 60 to 90 at % of silicon, 0 to 30 at % of iron and 0 to 10 at % of the first addition element. For example, to prepare a negative active material including 80 at % of silicon, 18 at % of iron, and 2 at % of manganese, the amount of silicon may be 66.83 g, the amount of iron may be 29.9 g, and the amount of manganese may be 3.27 g.

Thereafter, the first to third powders are milled and alloyed by mechanical alloying to distribute the fine silicon single phase inside the silicon-metal alloy phase in the negative active material powder (process S20).

In exemplary embodiments, the first powder, the second powder, and the third powder are loaded into a milling container, and then, the first to third powders are mixed, milled, and refined by mechanical alloying.

For example, the mixture of the powders and a milling ball are loaded into a milling container, and then, the powders are milled and alloyed by using the milling energy for a short period of time. The mixture of the powders may be milled into fine powder having more fine size. In particular, fine powder produced by milling caused by rotation and collision of the milling ball may be repeatedly subjected to micro forging, cold pressure welding, or crushing. Accordingly, when the fine powder is mixed, interface energy increases, and the interface energy acts as a driving force, promoting solid phase diffusion of atoms and fine alloying. By doing so, a negative active material powder, in which silicon, iron, and the first addition element are alloyed, is obtained. In the negative active material powder, a silicon single phase may be uniformly distributed in the silicon-metal alloy phase, and the first addition element may be included in a substitutional or interstitial form inside the silicon-metal alloy phase, or may be present at an interface of the silicon-metal alloy phase and the silicon single phase.

As the fine alloying proceeds, a silicon single phase in the fine powder is converted into a fine silicon single phase, and the fine silicon single phase may be uniformly distributed in the silicon-metal alloy phase acting as a matrix. For example, in the case of a negative active material formed by the milling and the alloying, the silicon single phase in the negative active material may be uniformly distributed with a particle diameter of 50 nm or less.

In the exemplary embodiments, the mechanical alloying may be performed by using a milling apparatus, such as a vertical attrition mill, a horizontal attrition mill, a ball mill, a planetary mill, and a Spex milling. For example, the mechanical alloying may be performed by using a horizontal attrition mill at a speed of about 200 to about 1800 rpm for tens of minutes or hours.

In exemplary embodiments, two or more milling processes having different rotation speeds may be repeatedly performed to provide the negative active material. In particular, for example, a first milling process, in which milling is performed at a rotation speed of 1300 rpm for 45 seconds, and a second milling process, in which milling is performed at a rotation speed of 700 rpm for 15 seconds, may be alternately performed to form the negative active material. The rotation speeds and the milling times are an example only, and a rotation speed and a milling time may vary according to a particle diameter distribution of a final negative active material powder particle and a particle diameter of the silicon single phase in the negative active material.

According to a method of preparing a negative active material, according to exemplary embodiments, a powder containing silicon, a powder containing iron, and a powder containing the first addition element are refined or alloyed by mechanical alloying. Accordingly, the preparation process for the negative active material is straightforward. Also, the method provides a negative active material in which fine silicon single phase obtained by mechanical alloying is uniformly distributed in the silicon-metal alloy phase.

Figure 2:
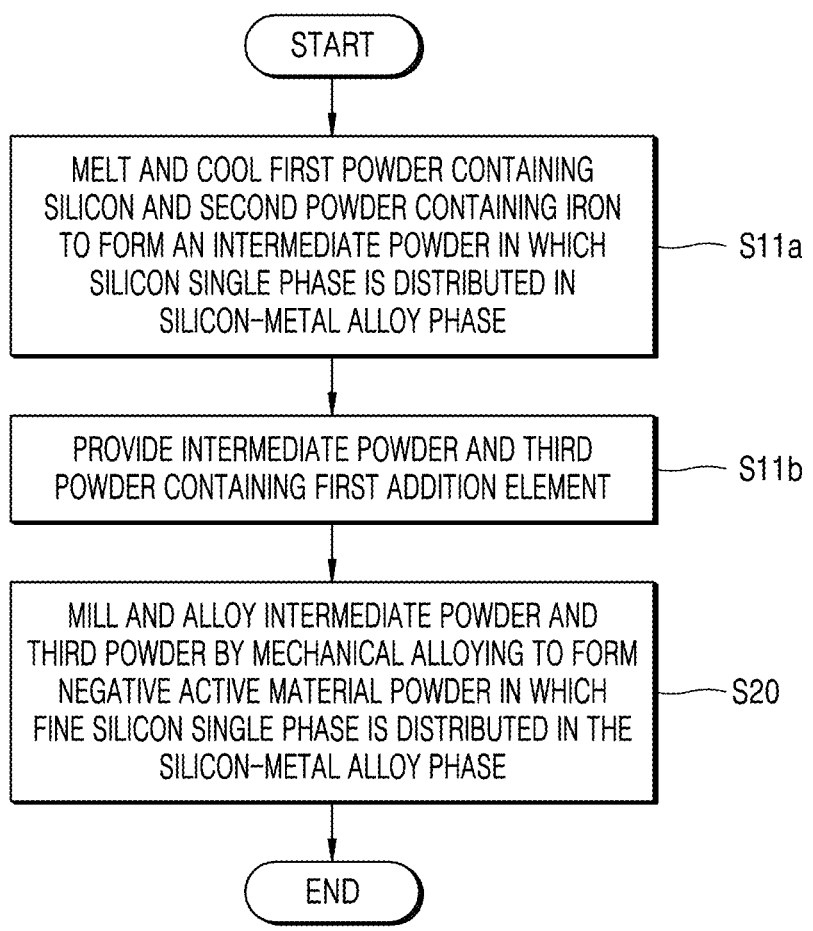
FIG. 2 shows a flowchart illustrating a method of preparing a negative active material, according to exemplary embodiments.

FIG. 2 shows a flowchart illustrating a method of preparing a negative active material, according to exemplary embodiments.

Referring to FIG. 2, a first powder containing silicon and a second powder containing iron are melted and cooled to form an intermediate powder in which a silicon single phase is distributed in the silicon-metal alloy phase (process S11a).

In some embodiments, a first powder containing silicon and a second powder containing iron are loaded into a melting container, which is then heated by arc-melting, high-frequency melting, or electricity melting to form an alloy molten product. For example, induction melting, which is an example of electric melting, may be used to heat the melting container to prepare an alloy molten product. In this regard, to prevent unwanted oxidation of the alloy molten product, the alloy molten product may be formed in a vacuum atmosphere or an inert gas atmosphere, such as an argon atmosphere or a nitrogen atmosphere. For example, a heating temperature of the melting container may be maintained at at least 200° C. or higher than the melting point of the alloy molten product, and accordingly, the alloy molten product in the melting container may be sufficiently melted and mixed.

In some embodiments, the alloy molten product is rapidly cooled and solidified by melt spinning to form a ribbon alloy, and then, the ribbon alloy is milled to form an intermediate powder containing silicon and iron.

An example of a process for forming a ribbon alloy by using a melt spinner will be described further in detail. The alloy molten product is discharged from the melting container to a top portion of a cooling roll that rapidly rotates, and the alloy molten product contacting the cooling roll rapidly cools, thereby forming a ribbon alloy. For example, the cooling speed of the ribbon alloy may be 10³° C./sec to 10⁷° C./sec, and the cooling speed may be dependent on the rotational speed, material, and temperature of the cooling roll. Also, when the alloy molten product cools, a coarse silicon single phase may be distributed in the silicon-metal alloy phase.

Examples of the rapid cooling of the alloy molten product include splat quenching, rotating drum quenching, double-roller quenching, chill block melt spinning, inside casting, a melt extraction method, a pendant drop melt extraction method, rotating electrode, electric explosion, and gas atomization, but are not limited thereto.

Thereafter, the ribbon alloy is milled by mechanical milling, such as ball milling, to form the intermediate powder. The intermediate powder may have a particle diameter of about tens of nanometers to about hundreds of micrometers.

Thereafter, the intermediate powder and a third powder containing a first addition element may be provided into a milling container (process S11b).

Thereafter, the intermediate powder and the third powder may be milled and alloyed by mechanical alloying to form negative active material powder in which fine silicon single phase is distributed in the silicon-metal alloy phase (process S20).

A process for forming the negative active material powder may be similar to the process that was explained in connection with FIG. 1. For example, the intermediate powder and the third powder are milled and alloyed for about tens of minutes to tens of hours by horizontal attrition milling, vertical attrition milling, ball milling, planetary milling, or Spex milling. Due to the impact caused by rotation and collision of a milling ball, micro forging, cold pressure welding, and crushing may repeatedly occur among powder particles, and the first addition element may diffuse into the silicon-metal alloy phase. Also, the silicon single phase inside the negative active material powder may be further refined.

Figure 3:
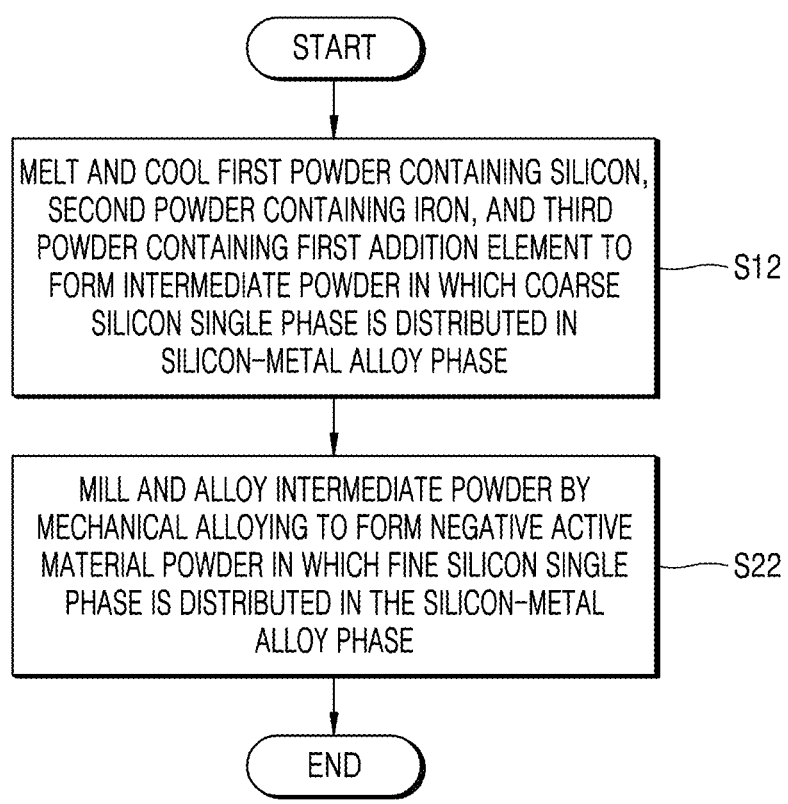
FIG. 3 shows a flowchart illustrating a method of preparing a negative active material, according to exemplary embodiments.

FIG. 3 shows a flowchart illustrating a method of preparing a negative active material, according to exemplary embodiments.

Referring to FIG. 3, a first powder containing silicon, a second powder containing iron, and a third powder containing a first addition element may be melted and cooled to form an intermediate powder in which a coarse silicon single phase is distributed in the silicon-metal alloy phase (process S12).

In some embodiments, the melting process and the cooling process may be similar to the processes explained in connection with FIG. 2 in process S11a.

Thereafter, the intermediate powder may be milled and alloyed by mechanical alloying to form negative active material powder in which fine silicon single phase is distributed in the silicon-metal alloy phase (process S22).

According to another aspect, a negative electrode includes the negative active material. The negative electrode may include a negative active material. In an example of manufacturing a negative electrode, the negative active material, a binder, and optionally, a conductive agent are mixed in a solvent to prepare a negative active material composition, and the negative active material composition may be molded in a certain shape, or coated on a current collector.

The binder used in the negative active material composition helps the negative active material bind to the conductive agent and to the current collector, and may be added in an amount of 1 to 50 parts by weight based on 100 parts by weight of the negative active material. For example, the binder may be added, based on 100 parts by weight of the negative active material, in an amount of 1 to 30 parts by weight, 1 to 20 parts by weight, or 1 to 15 parts by weight. Examples of the binder are polyvinylidene fluoride, polyvinylidene chloride, polybenzimidazole, polyimide, polyvinylacetate, polyacrylonitrile, polyvinylalcohol, carboxymethylcellulose (CMC), starch, hydroxypropylcellulose, regenerated cellulose, polyvinylpyrrolidone, tetrafluoro ethylene, polyethylene, polypropylene, polystyrene, polymethylmethacrylate, polyaniline, acrylonitrilebutadienestyrene, phenol resin, epoxy resin, polyethyleneterephthalate, polytetrafluoroethylene, polyphenylsulfide, polyamideimide, polyetherimide, polyethylenesulfone, polyamide, polyacetal, polyphenyleneoxide, polybutyleneterephthalate, ethylene-propylene-diene terpolymer (EPDM), sulfonated EPDM, styrene butadiene rubber, fluorine rubber, and various copolymers.

The negative electrode may optionally include a conductive agent to provide a conduction pathway to the negative active material so as to improve electric conductivity. The conductive agent may be any of materials that are used in a lithium battery, and examples thereof are a carbonaceous material, such as carbon black, acetylene black, ketjen black, or carbon fiber (for example, vapor-grown carbon fiber); a metallic material, such as a powder or fiber of metal, such as copper, nickel, aluminum, or silver; a conductive polymer, such as a polyphenylene derivative; and a mixture thereof. An amount of the conductive agent may vary according to purpose. For example, a weight ratio of the negative active material to the conductive agent may be in a range of 99:1 to 90:10.

The solvent may be N-methylpyrrolidone (NMP), acetone, or water. An amount of the solvent may be, based on 100 parts by weight of the negative active material, in a range of 1 to 10 parts by weight.

The current collector may have a thickness of 3 to 500 µm. A material for forming the current collector may not be limited as long as the material has conductivity and does not induce chemical change in a battery. Such a material may be, for example, copper, stainless steel, aluminum, nickel, titanium, calcined carbon, copper, stainless steel that is surface-treated with carbon, nickel, titanium, or silver, or aluminum-cadmium alloy. Also, the conductive collector may have an uneven surface which leads to a higher binding force of the negative active material, and may be used in the form of, for example, a film, a sheet, a foil, a net, a porous structure, a foam, or a non-woven fabric.

The negative active material composition may be directly coated on a current collector to prepare a negative electrode plate, or may be cast onto a separate support and a negative active material film exfoliated from the separate support is laminated on a copper foil current collector to obtain a negative electrode plate. A method of manufacturing the negative electrode is not limited thereto, and other manufacturing methods may instead be used to prepare the negative electrode.

According to another aspect, a lithium battery includes the negative electrode. For example, a lithium battery according to an embodiment may include a negative electrode including the negative active material; a positive electrode facing the negative electrode; and an electrolyte between the negative electrode and the positive electrode.

An example of a method of manufacturing a positive electrode will be described. A positive active material, a conductive agent, a binder, and a solvent are mixed to prepare a positive active material composition.

The positive active material may be any of materials that are used as a positive active material in the art. In detail, the following materials may each be used as a core of the positive active material: compounds represented by $Li_aA_{1-b}B'_bD'_2$ (wherein $0.90 \leq a \leq 1$, and $0 \leq b \leq 0.5$); $Li_aE_{1-b}B'_bO_{2-c}D'_c$ (wherein $0.90 \leq a \leq 1$, $0 \leq b \leq 0.5$, and $0 \leq c \leq 0.05$); $LiE_{2-b}B'_bO_{4-c}D'_c$ (wherein $0 \leq b \leq 0.5$, and $0 \leq c \leq 0.05$); $Li_aNi_{1-b-c}Co_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Co_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Co_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cD'_\alpha$ (wherein $0.90 \leq a \leq 1$, $0 \leq b \leq 0.5$, $0 \leq c \leq 0.05$, and $0 < \alpha \leq 2$); $Li_aNi_{1-b-c}Mn_bB'_cO_{2-\alpha}F'_\alpha$ (wherein $0.90 \leq a \leq 1$, $0 \leq b \leq 0.5$, $0 \leq c \leq 0.05$, and $0 < \alpha < 2$); $Li_aNi_{1-b-c}Mn_bB'_cO_{2-\alpha}F'_2$ (wherein $0.90 \leq a \leq 1$, $0 \leq b \leq 0.5$, $0 \leq c \leq 0.05$, and $0 < \alpha < 2$); $Li_aNi_bE_cG_dO_2$ (wherein $0.90 \leq a \leq 1$, $0 \leq b \leq 0.9$, $0 \leq c \leq 0.5$, and $0.001 \leq d \leq 0.1$); $Li_aNi_bCo_c$-$Mn_dG_eO_2$ (wherein $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (wherein $0.90 \leq a \leq 1$, and $0.001 \leq b \leq 0.1$); $Li_aCoG_bO_2$ (wherein $0.90 \leq a \leq 1$, and $0.001 \leq b \leq 0.1$); $Li_aMnG_bO_2$ (wherein $0.90 \leq a \leq 1$, and $0.001 \leq b \leq 0.1$); $Li_aMn_2G_bO_4$ (wherein $0.90 \leq a \leq 1$, and $0.001 \leq b \leq 0.1$); $QO_2$; $QS_2$; $LiQS_2$; $V_2O_5$; $LiV_2O_5$; $LiI'O_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In these formulae above, A is Ni, Co, Mn, or a combination thereof; B' is Al, Ni, Co, Mn, Cr, Fe, Mg, Sr, V, a rare-earth element, or a combination thereof; D' is O, F, S, P, or a combination thereof; E is Co, Mn, or a combination thereof; F' is F, S, P, or a combination thereof; G is Al, Cr, Mn, Fe, Mg, La, Ce, Sr, V, or a combination thereof; Q is Ti, Mo, Mn, or a combination thereof; I' is Cr, V, Fe, Sc, Y, or a combination thereof; and J is V, Cr, Mn, Co, Ni, Cu, or a combination thereof.

For example, the positive active material may be a compound represented by any one selected from $LiCoO_2$, $LiMn_xO_2$ (x=1, 2), $LiNi_{1-x}Mn_xO_{2x}$ ($0<x<1$), $LiNi_{1-x-y}Co_x$-$Mn_yO_2$ ($0 \leq x \leq 0.5$, $0 \leq y \leq 0.5$), and $FePO_4$.

The conductive agent, the binder, and the solvent, which are used in the negative active material composition, may also be used in the positive active material. In some cases, a plasticizer may be added to the positive active material composition and the negative active material composition to form a pore in an electrode plate. Amounts of the positive active material, the conductive agent, the binder, and the solvent may be at the same levels as those in a lithium battery.

The positive electrode current collector may have a thickness of 3 μm to 500 μm, and may not be limited as long as it does not cause chemical change in a battery and has high conductivity. A material for the positive electrode current collector may be, for example, stainless steel, aluminum, nickel, titanium, calcined carbon, aluminum, or stainless steel that is surface-treated with carbon, nickel, titanium, or silver. The positive electrode current collector may have an uneven surface which leads to a higher binding force of the positive active material, and may be used in the form of, for example, a film, a sheet, a foil, a net, a porous structure, a foam, or a non-woven fabric.

The positive active material composition may be directly coated and dried on the positive electrode current collector to prepare a positive electrode plate. In some embodiments, the positive active material composition may be cast onto a separate support, and then, a film exfoliated from the separate support is laminated on the positive electrode current collector to prepare a positive electrode plate.

The positive electrode and the negative electrode may be separated from each other by a separator, and the separator may be any of those that are used in a lithium battery. A material for forming the separator may be, for example, a material that has low resistance to ion migration of an electrolyte and has excellent electrolytic solution retaining capability. For example, a material for forming the separator may be glass fiber, polyester, Teflon, polyethylene, polypropylene, polytetrafluoroethylene (PTFE), or a combination thereof, each of which may be in a non-woven fabric or woven fabric form. The separator may have a pore diameter of 0.01 μm to 10 μm, and a thickness of 5 μm to 300 μm.

A lithium salt-containing non-aqueous electrolyte may include a non-aqueous electrolytic solution and lithium. Examples of the non-aqueous electrolyte are a non-aqueous electrolytic solution, a solid electrolyte, and an inorganic solid electrolyte.

The non-aqueous electrolytic solution may be, for example, an aprotic solvent, such as N-methyl-2-pyrrolidinone, propylene carbonate, ethylene carbonate, butylene carbonate, dimethyl carbonate, diethyl carbonate, ethylene fluoride carbonate, ethylenemethylene carbonate, methylpropyl carbonate, ethyl propanoate, methyl acetate, ethyl acetate, propyl acetate, dimethylester gamma-butyrolactone, 1,2-dimethoxy ethane, tetrahydrofurane, 2-methyl tetrahydrofuran, dimethylsulfoxide, 1,3-dioxorane, formamide, dimethylformamide, dioxorun, acetonitrile, nitromethane, methyl formic acid, trimester phosphoric acid, trimethoxy methane, a dioxoran derivative, sulfolane, methyl sulfolane, 1,3-dimethyl-2-imidazolidinone, a propylene carbonate derivative, a tetrahydrofuran derivative, ether, methyl propionic acid, or ethyl propionic acid.

The organic solid electrolyte may be, for example, a polyethylene derivative, a polyethylene oxide derivative, a polypropylene oxide derivative, ester phosphate polymer, polyagitation lysine, polyester sulfide, polyvinyl alcohol, polyvinylidene fluoride, or a polymer containing an ionic dissociating agent.

The inorganic solid electrolyte may be, for example, a nitride, halide, or sulfate of Li, such as $Li_3N$, $LiI$, $Li_5NI_2$, $Li_3N$—$LiI$—$LiOH$, $LiSiO_4$, $LiSiO_4$—$LiI$—$LiOH$, $Li_2SiS_3$, $Li_4SiO_4$, $Li_4SiO_4$—$LiI$—$LiOH$, or $Li_3PO_4$—$Li_2S$—$SiS_2$.

The lithium salt may be any one of various materials that are conventionally used in a lithium battery, and as a material that is easily dissolved in the non-aqueous electrolyte, for example, at least one selected from $LiCl$, $LiBr$, $LiI$, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, lithium chloroborate, lower aliphatic lithium carbonate, 4 phenyl lithium borate, or imide may be used.

The lithium battery may be a lithium ion battery, a lithium ion polymer battery, or a lithium polymer battery which are distinguishable from each other in terms of a separator and an electrolyte, and may be a cylindrical battery, a rectangular battery, a coin-type battery, or a pouch-type battery, which are distinguishable from each other in terms of shape, and may be a bulk-type battery or a thin film-type battery which are distinguishable from each other in terms of size. In some embodiments, the lithium battery may be a primary lithium battery or a secondary lithium battery.

Methods of manufacturing these batteries are well known in the art, and accordingly, will be omitted herein.

Figure 9:
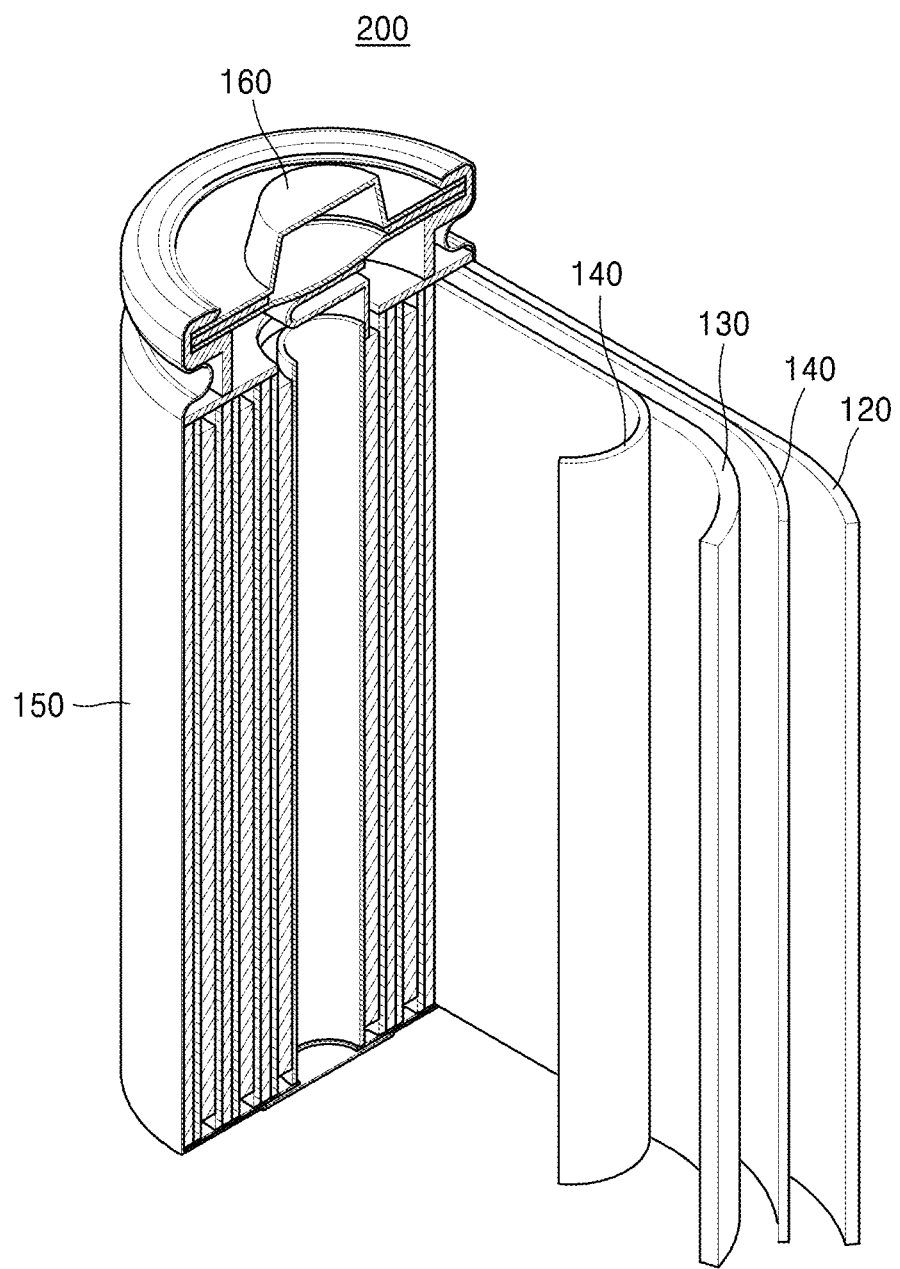
FIG. 9 shows a schematic view of a lithium battery according to an exemplary embodiment.

FIG. 9 shows a schematic structure of a lithium battery 200 according to an embodiment of the inventive concept.

Referring to FIG. 9, the lithium battery 200 includes a positive electrode 130, a negative electrode 120, and a separator 140 between the positive electrode 130 and the negative electrode 120. The positive electrode 130, the negative electrode 120, and the separator 140 are wound or folded, and housed into a battery case 150. Subsequently, an electrolyte is injected into the battery case 150, which is then sealed by a sealing member 160, thereby completing manufacture of a lithium battery 200. The battery case 150 may be a cylindrical, rectangular, or thin-film type battery. The lithium battery 200 may be a lithium ion battery.

The lithium secondary battery may be a winding-type battery or a stack-type battery which are distinguishable from each other in terms of how electrodes are assembled, and may be a cylindrical battery, a rectangular battery, a coin-type battery, or a pouch-type battery, which are distinguishable from each other in terms of a cladding material.

The lithium battery may be used as a power source for small devices, and may also be used as a unit battery for a middle- and large-size device battery module including a plurality of batteries.

Examples of the middle- and large-size device are a power tool; xEV, such as an electric vehicle (EV), a hybrid electric vehicle (HEV), or a plug-in hybrid electric vehicle (PHEV); an electric bicycle, such as an E-bike or E-scooter; an electric golf cart; an electric truck; a commercially available electric car; and a power storage system, but are not limited thereto. The lithium battery may be used in various applications that require high power output, high voltage, and high-temperature driving.

Hereinafter, experimental examples for negative active material powder for a secondary battery prepared by using a method of preparing a negative active material, according to exemplary embodiments, will be described in detail.

Table 1 below shows mother alloy formation and milling conditions of negative active materials for a secondary battery according to exemplary embodiments.

A negative active material ($Si_{80}Fe_{18}Mn_2$) according to Example 1 included 18 at % of iron, 80 at % of silicon, and 2 at % of manganese, a negative active material ($Si_{80}Fe_{16}Mn_4$) according to Example 2 included 16 at % of iron, 80 at % of silicon, and 4 at % of manganese, and a negative active material ($Si_{80}Fe_{14}Mn_6$) according to Example 3 included 14 at % of iron, 80 at % of silicon, and 6 at % of manganese. For example, a negative active material according to Example 1 was prepared by using 66.83 g of a first powder that contains silicon, and 29.9 g of a second powder that contains iron, and 3.27 g of a third powder that contains manganese, the powders were induction-melted to form a mother alloy molten product, and then, the mother alloy molten product was solidified by rapid cooling to prepare a ribbon alloy. The ribbon alloy was milled into powder having a particle diameter of about 100 micrometers by using a mortar. Thereafter, the result was subjected to milling and alloying for 10 hours by using a horizontal attrition milling apparatus (Simoloyer CM01 of Zoz-GmbH Company; Wenden, Germany). During the milling and alloying, a chromium steel ball having a diameter of 4.7 mm and a weight of 15 kg was used. The milling was performed for 10 hours, including a first milling performed at a rotation speed of 1300 rpm for 45 seconds and a second milling performed at a rotation speed of 700 rpm for 15 seconds. A negative active material according to Example 2 was prepared by using 66.87 g of silicon, 26.59 g of iron, and 6.54 g of manganese, and a negative active material according to Example 3 was prepared by using 66.9 g of silicon, 23.28 g of iron, and 9.82 g of manganese. The negative active materials of Examples 2 and 3 were prepared in the same manner as in Example 1.

A negative active material according to Example 4 ($Si_{80}Fe_{16}Cr_4$) included 16 at % of iron, 80 at % of silicon, and 4 at % of chromium, and a negative active material according to Example 5 ($Si_{79}Fe_{19}Al_2$) included 19 at % of iron, 79 at % of silicon, and 2 at % of aluminum. The negative active material according to Example 4 was prepared in the same manner as in Example 1, except that 67.10 g of silicon, 26.69 g of iron, and 6.21 g of chromium were used. The negative active material according to Example 5 was prepared in the same manner as in Example 1, except that 66.55 g of silicon, 31.83 g of iron, and 1.62 g of aluminum were used.

A negative active material according to Comparative Example 1 ($Si_{80}Fe_{20}$) included 20 at % iron and 80 at % silicon. To prepare the negative active material according to Comparative Example 1, 94.32 g of first powder containing silicon, and 5.67 g of second powder containing iron were used, and the powders were arc-melted and solidified by rapid cooling to prepare a ribbon alloy. Thereafter, the prepared ribbon alloy was milled into powder having a particle diameter of about 100 micrometers by using a mortar, and the resultant powder was subjected to milling for about 8 hours by using a horizontal attrition milling apparatus.

A negative active material according to Comparative Example 2 ($Si_{70}Fe_{15}Co_{15}$) included 15 at % of iron, 70 at % of silicon, and 15 at % of cobalt. The negative active material according to Comparative Example 2 was prepared in the same manner as in Example 1, except that 53.31 g of silicon, 22.72 g of iron, and 23.97 g of cobalt were used.

TABLE 1

| | Composition | Ratio of an atomic molar fraction of silicon to the sum of an atomic molar fraction of iron and an atomic molar fraction of first addition element | Powder preparation method | Milling conditions |
| --- | --- | --- | --- | --- |
| Comparative Example 1 | $Si_{80}Fe_{20}$ | 4 | Arc-melting was performed to prepare a mother alloy, which was then subjected to mechanical milling (mortar was used) | Horizontal attrition milling, 8 hr (1300 rpm-45 sec, 700 rpm-15 sec) |
| Comparative Example 2 | $Si_{70}Fe_{15}Co_{15}$ | 2.3 | Induction-melting was performed to prepare a mother alloy, which was then subjected to mechanical milling (mortar was used) | Horizontal attrition milling, 10 hr (1300 rpm-45 sec, 700 rpm-15 sec) |
| Example 1 | $Si_{80}Fe_{18}Mn_2$ | 4 | Induction-melting was performed to prepare a mother alloy, which was then subjected to mechanical milling (mortar was used) | Horizontal attrition milling, 10 hr (1300 rpm-45 sec, 700 rpm-15 sec) |
| Example 2 | $Si_{80}Fe_{16}Mn_4$ | 4 | Induction-melting was performed to prepare a mother alloy, which was then subjected to mechanical milling (mortar was used) | Horizontal attrition milling, 10 hr (1300 rpm-45 sec, 700 rpm-15 sec) |

TABLE 1-continued

| | Composition | Ratio of an atomic molar fraction of silicon to the sum of an atomic molar fraction of iron and an atomic molar fraction of first addition element | Powder preparation method | Milling conditions |
|---|---|---|---|---|
| Example 3 | $Si_{80}Fe_{14}Mn_6$ | 4 | Induction-melting was performed to prepare a mother alloy, which was then subjected to mechanical milling (mortar was used) | Horizontal attrition milling, 10 hr (1300 rpm-45 sec, 700 rpm-15 sec) |
| Example 4 | $Si_{80}Fe_{16}Cr_4$ | 4 | Induction-melting was performed to prepare a mother alloy, which was then subjected to mechanical milling (mortar was used) | Horizontal attrition milling, 10 hr (1300 rpm-45 sec, 700 rpm-15 sec) |
| Example 5 | $Si_{79}Fe_{19}Al_2$ | 3.8 | Induction-melting was performed to prepare a mother alloy, which was then subjected to mechanical milling (mortar was used) | Horizontal attrition milling, 10 hr (1300 rpm-45 sec, 700 rpm-15 sec) |

Figure 4:
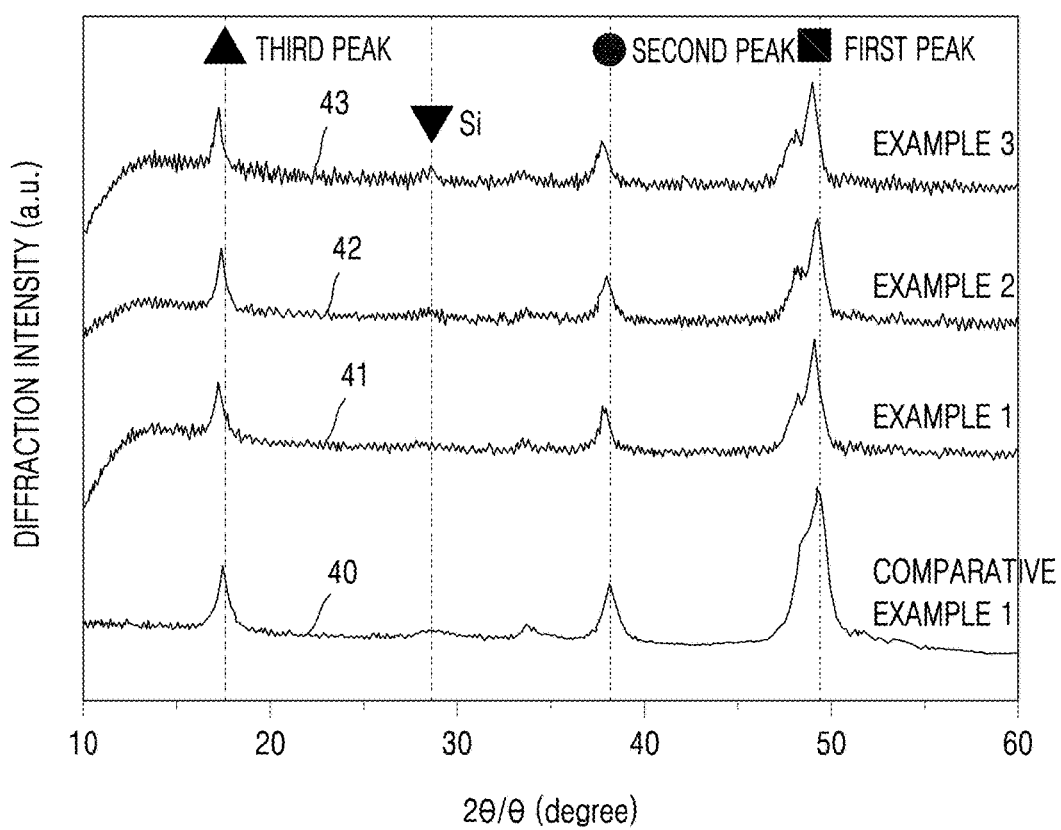
FIG. 4 shows an X-ray diffraction pattern of negative active materials prepared according to exemplary embodiments.

FIG. 4 shows an X-ray diffraction pattern of negative active materials prepared according to exemplary embodiments. X-ray diffraction patterns were obtained by using an X-ray diffraction spectrometer (Bruker, D8 focus; Billerica, USA) using a CuKα target (1.5406 Å) at 40 kV and 40 mA, at a scanning rate of 0.5 degrees (°)/min. The 2 theta angle ranged between 10-60 degrees.

Diffraction peak values and diffraction intensity values observed in FIG. 4 are shown in Table 2.

TABLE 2

| | First peak | | Second peak | | Intensity ratio of first peak:second peak |
|---|---|---|---|---|---|
| | Location (degree) | Diffraction intensity (a.u.) | Location (degree) | Diffraction intensity (a.u.) | |
| Comparative Example 1 | 49.27 | 1922 | 38.19 | 851 | 2.26:1 |
| Comparative Example 2 | 49.17 | 3966 | 37.97 | 1665 | 2.38:1 |
| Example 1 | 49.12 | 1467 | 37.98 | 787 | 1.86:1 |
| Example 2 | 49.29 | 1315 | 38.04 | 729 | 1.80:1 |
| Example 3 | 49.08 | 1307 | 37.86 | 687 | 1.90:1 |
| Example 4 | 49.07 | 3155 | 37.77 | 1670 | 1.89:1 |
| Example 5 | 49.19 | 3140 | 38.00 | 1660 | 1.89:1 |

Referring to FIG. 4 and Table 2, Comparative Example 1 (40) and Examples 1 to 3 (41, 42, 43) show first to third peaks (■, ●, ▲). A silicon single phase has a diamond cubic crystal structure (space group: Fd3(227)), and an $FeSi_2$ phase has a tetragonal crystal structure (space group: P4/mmm(123)). Referring to FIG. 4, the first peak (■) is a diffraction peak corresponding to a crystallographic (102) face of the $FeSi_2$ phase, and the second peak (●) is a diffraction peak corresponding to a crystallographic (101) face of the $FeSi_2$ phase. The third peak (▲) is a diffraction peak corresponding to a crystallographic (001) face of the $FeSi_2$ phase.

Referring to Table 2, diffraction intensities of the first and second peaks of Comparative Example 1 (40) are 1922 and 851, respectively, and diffraction intensities of the first and second peaks of Example 1 (41) are 1467 and 787, respectively. Example 2 (42) has diffraction intensities of 1315 and 729, and Example 3 (43) has diffraction intensities of 1307 and 687. Accordingly, compared to Comparative Example 1 (40), Examples 1 to 3 (41, 42, 43) have substantially low diffraction intensity. This is because Examples 1 to 3 (41, 42, 43) include 2 to 6 at % of a first addition element (for example, manganese), and thus, the first addition element contributes to refining of a silicon single phase and a silicon-metal alloy phase surrounding the silicon single phase. Therefore, as a particle diameter decreases, a width of a diffraction peak (for example, a full width at half maximum: FWHM) may increase. Accordingly, the intensity of the diffraction peak may decrease. In particular, the decrease in the intensity of the diffraction peaks of Examples 1 to 3 (41, 42, 43), compared to Comparative Example 1 (40), is considered to occur due to the refining of the silicon single phase and the silicon-metal alloy phase done by the first addition element.

Regarding Example 1 (41), the diffraction intensity of the first peak is 1.86 times that of the second peak, and in the case of Example 2 (42) and Example 3 (43), 1.8 and 1.9 times that of the second peak, respectively. Regarding Comparative Example 1 (40), the diffraction intensity of the first peak is 2.26 times that of the second peak. Such a difference in diffraction intensity may occur, for example as in the case of the negative active materials of Examples 1 to 3 (41, 42, 43), the diffraction intensity of the first peak decreases and the diffraction intensity of the second peak increases, or in the case where the diffraction intensity of the first peak substantially decreases and the diffraction intensity of the second peak has a minimal decrease. In the case of Examples 1 to 3 (41, 42, 43) including the first addition element, the first addition element may be included in a silicon-metal alloy phase (for example, substitution with silicon or iron inside $FeSi_2$ or being interstitial inside $FeSi_2$, i.e. an interstitial dopant or a substitutional dopant), and accordingly, stress may affect the lattice of an $FeSi_2$ crystal structure thus leading to distortion.

Although not illustrated in FIG. 4, in the case of Example 4, the diffraction intensity of a first peak was 1.89 times that of a second peak, in the case of Example 5, the diffraction intensity of a first peak was 1.89 times that of a second peak, and in the case of Comparative Example 2, the diffraction intensity of a first peak was 2.38 times that of a second peak.

Referring to Table 2, Comparative Example 1 (40) shows a first peak at about 49.27 degrees and a second peak at 38.19 degrees, and Example 1 (41) shows a first peak at about 49.12 degrees and a second peak at 37.98 degrees. Example 3 (43) shows a first peak at about 49.08 degrees and a second peak at about 37.86 degrees. As such, the location of a diffraction peak may be shifted to the right or the left by about 0.5 degrees maximum. Since in a X-ray diffraction pattern, the location of the diffraction peak is dependent on a distance between faces (e.g. a lattice constant), the shift of the diffraction peak may originate from lattice distortion of a crystal structure (for example, shrinkage or expansion). For example, compared to Comparative Example 1 (40), the first and second peaks of Example 1 (41) were shifted left by 0.15 degrees and 0.21 degrees, respectively (with respect to the X axis), because the lattice of the silicon-metal alloy phase shrunk due to the first addition element.

Figure 5A:
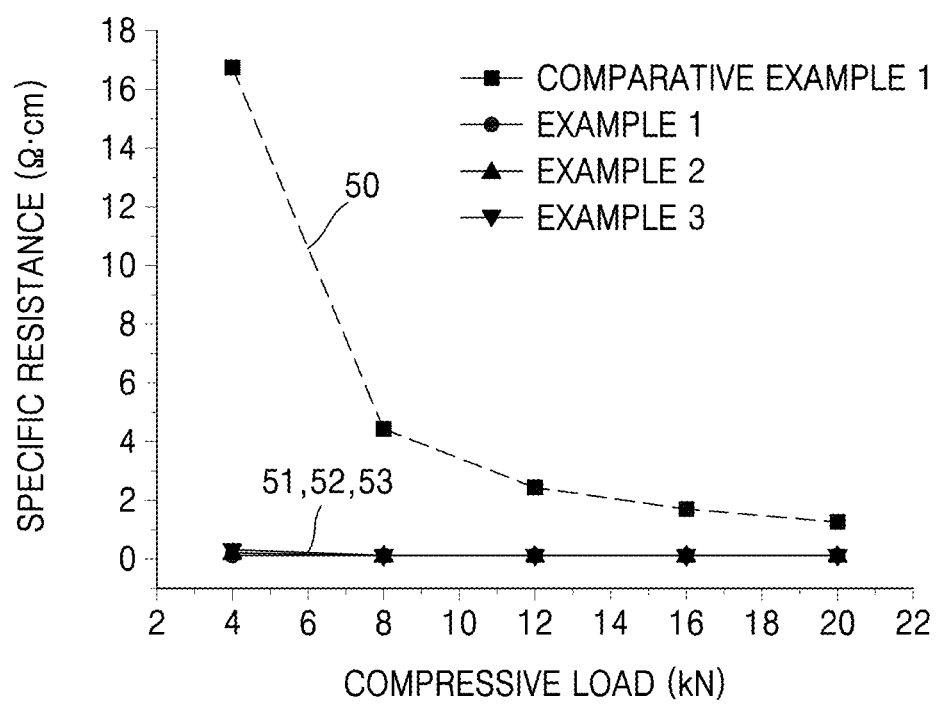
FIGS. 5A and 5B show graphs of an electrical performance of negative active materials prepared according to exemplary embodiments.
Figure 5B:
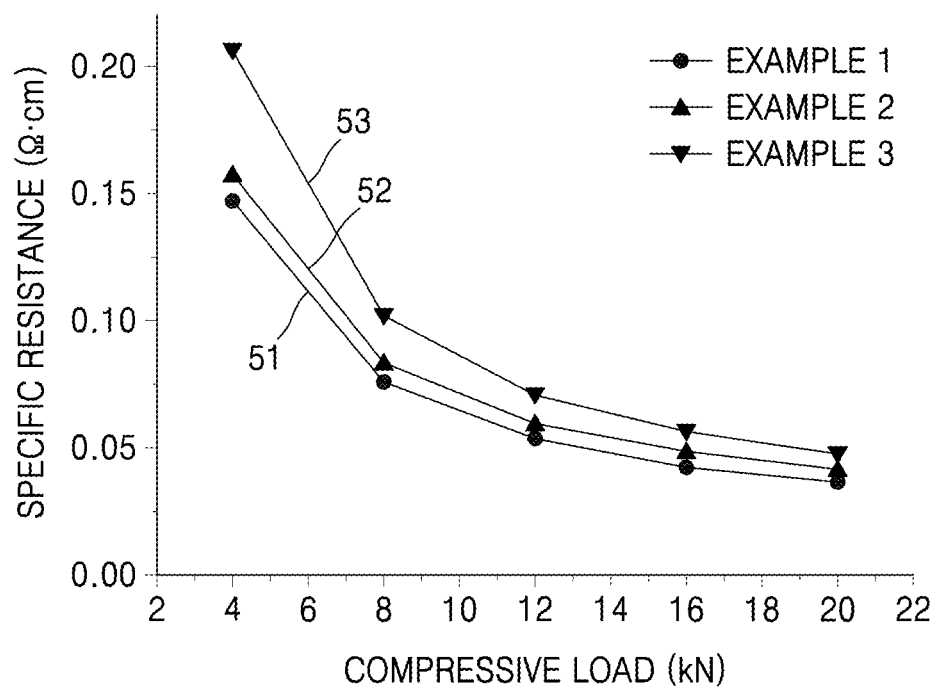

FIGS. 5A and 5B show a graph of an electric performance of negative active materials prepared according to exemplary embodiments. In detail, FIGS. 5A and 5B show specific resistance values of the negative active materials of exemplary embodiments, and the specific resistance values of Examples 1 to 3 (51, 52, 53) shown in FIG. 5A are enlarged in FIG. 5B. Also, specific resistance values according to a compressive load are shown in Table 3 below.

TABLE 3

|  | Specific resistance according to applied compressive load | | | | |
| --- | --- | --- | --- | --- | --- |
|  | 4 kN | 8 kN | 12 kN | 16 kN | 20 kN |
| Comparative Example 1 | 16.8 | 4.4 | 2.47 | 1.69 | 1.29 |
| Example 1 | 0.15 | 0.08 | 0.05 | 0.04 | 0.04 |
| Example 2 | 0.16 | 0.08 | 0.06 | 0.05 | 0.04 |
| Example 3 | 0.20 | 0.10 | 0.07 | 0.06 | 0.05 |

Referring to FIGS. 5A, 5B, and Table 3, Examples 1 to 3 (51, 52, 53) show a specific resistance of about 0.20 Ωcm or lower when a compressive load of 4 to 20 kN is applied thereto, whereas, in comparison, Comparative Example 1 (50) shows a specific resistance of 16.8 Ωcm when a compressive load of 4 kN is applied. Examples 1 to 3 (51, 52, 53) show substantially low specific resistances, because the first addition element refines a silicon single phase and a silicon-metal alloy phase, leading to a substantial increase in electrical conductivity of a negative active material. In addition, since the first addition element is included in the form of an interstitial or substitutional dopant either inside the silicon-metal alloy phase or at an interface of the silicon single phase and the silicon-metal alloy phase, the first addition element may contribute to an increase in electrical conductivity.

In general, in the case of a silicon negative active material, due to the specific resistance, a voltage drop, e.g. IR drop, according to current flow during charging and discharging may increase, and as a result, energy density may decrease. However, since Examples 1 to 3 (51, 52, 53) have substantially low specific resistance values, the voltage drop may be minimized and thus resulting in a negative active material having high energy density.

In general, a negative electrode is manufactured by coating a mixture of a negative active material and an electric conductive material, for example, an organic binder, on a foil for a negative electrode. In this regard, due to the low specific resistance of a conventional silicon negative active material, when the amount of the conductive material included in the negative electrode is high, a secondary battery including the negative electrode may result in low capacity. However, in the case of the negative active materials prepared according to exemplary embodiments, due to their substantially low specific resistance values thereof, the amount of the conductive material may decrease, and thus, resulting in a secondary battery having high capacity.

Figure 6:
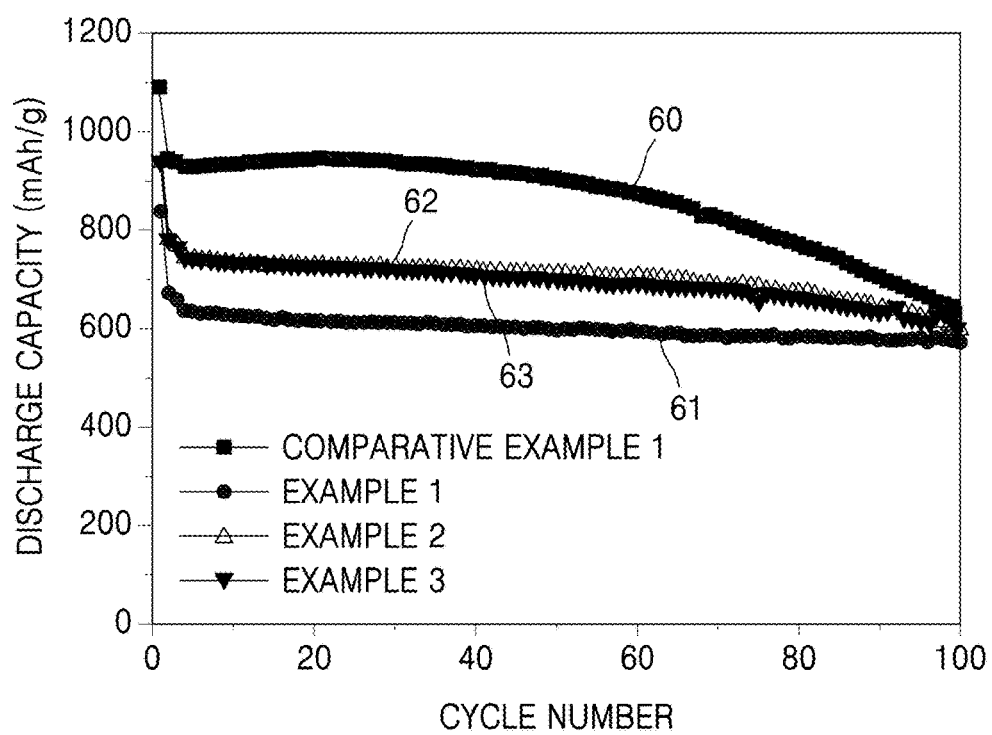
FIG. 6 shows a graph of an electrochemical performance of negative active materials according to exemplary embodiments.

FIG. 6 shows a graph of an electrochemical performance of negative active materials according to exemplary embodiments. FIG. 6 shows a graph of discharge capacity with respect to the number cycles of negative active materials prepared according to exemplary embodiments. The initial efficiency (%), initial discharge capacity (or discharge capacity in the $2^{nd}$ cycle) (mAh/g), $100^{th}$ cycle discharge capacity (mAh/g), and cycle retention ratio (%) of the negative active materials are shown in Table 4 below.

Accordingly, the negative active materials prepared according to Comparative Examples 1 and 2 and Examples 1 to 5 were used to manufacture coin-type half cells, of which a reference electrode was a lithium metal, and in a first cycle, charging and discharging were performed at a current density of 0.1 C, in a second cycle, charging and discharging were performed at a current density of 0.2 C, and from a third cycle to a $100^{th}$ cycle, charging and discharging were performed at a current density of 1 C.

TABLE 4

|  | Initial efficiency (%) | Initial discharge capacity (mAh/g) | $100^{th}$ discharge capacity (mAh/g) | Cycle retention ratio (%) |
| --- | --- | --- | --- | --- |
| Comparative Example 1 | 86.0 | 945.7 | 634.2 | 67.1 |
| Comparative Example 2 | 39.7 | 123.9 | 89.0 | 71.8 |
| Example 1 | 80.8 | 672.8 | 574.8 | 85.4 |
| Example 2 | 83.6 | 782.7 | 606.5 | 77.5 |
| Example 3 | 83.3 | 783.4 | 584.5 | 74.6 |
| Example 4 | 83.3 | 904.8 | 677.2 | 74.8 |
| Example 5 | 85.7 | 840.4 | 607.6 | 72.2 |

Referring to FIG. 6 and Table 4, it was confirmed that Examples 1 to 3 (61, 62, 63) have excellent cycle performance, compared to Comparative Example 1 (60). In detail, Examples 1 to 3 (61, 62, 63) show high cycle retention ratios (%) of 85.4%, 77.5%, and 74.6%, respectively, and Comparative Example 1 (60) shows a cycle retention ratio of 67.1%. As described above, when Examples 1 to 3 (61, 62, 63) include a first addition element, a silicon single phase and a silicon-metal alloy phase surrounding the silicon single phase are refined, and accordingly, the silicon-metal alloy phase may effectively buffer the volumetric expansion of the silicon single phase, caused by intercalation or deintercalation of lithium ions in a silicon single phase. Accordingly, Examples 1 to 3 (61, 62, 63) including the first addition element show excellent lifespan characteristics.

Examples 1 to 3 (61, 62, 63) show (60) relatively low initial efficiency and initial discharge capacity compared to Comparative Example 1. This is because since Examples 1 to 3 (61, 62, 63) include the first addition element, the amounts of silicon and iron acting as an active area are relatively decreased where lithium ions are intercalated or deintercalated during when the negative active material is charged or discharged.

Although not illustrated in FIG. 6, it may be seen that Examples 4 and 5 show better lifespan characteristics than Comparative Examples 1 and 2.

Figure 7A:
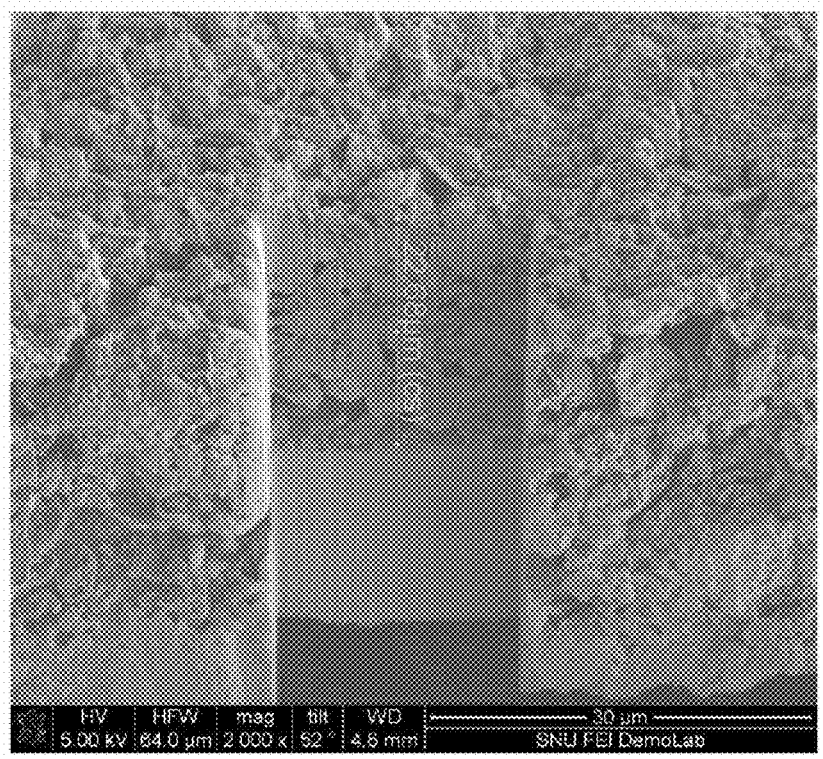
FIGS. 7A to 7C show scanning electron microscopy (SEM) images of negative active materials prepared according to exemplary embodiments.
Figure 7B:
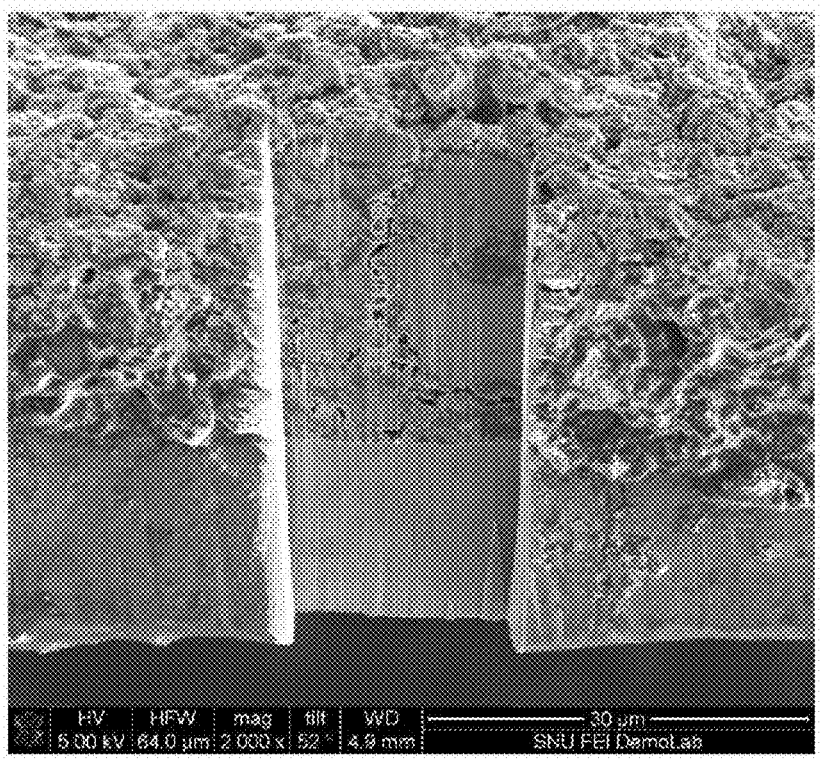
Figure 7C:
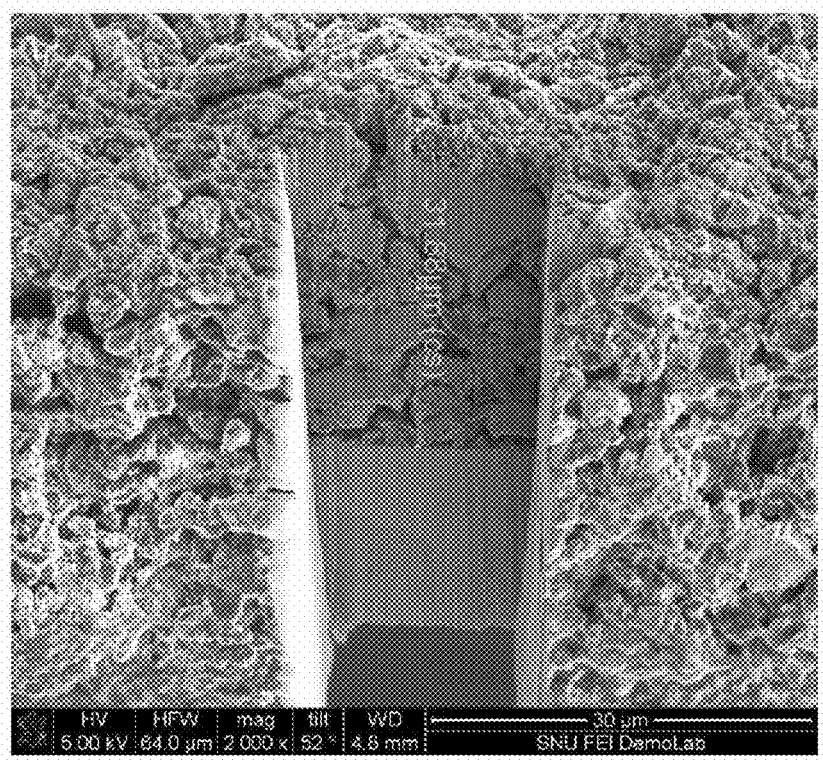

FIGS. 7A to 7C show scanning electron microscopy (SEM) images of negative active materials prepared according to exemplary embodiments. FIGS. 7A to 7C show SEM images of electrodes using a negative active material before the cycle test, after the first charging, and after the $50^{th}$ discharging.

Referring to FIGS. 7A to 7C, before the cycle test, an electrode including a negative active material has a thickness of about 22 micrometers, and after the 1st cycling, the thickness of the electrode is about 31.4 micrometers. This result shows that due to the charging, the electrode expands by 50% or less of its initial thickness. In the case of a conventional negative active silicon material, during charging (e.g. when lithium ions are intercalated), a volumetric expansion reaches about 400%. In comparison with such a high value, it was confirmed that the negative active materials prepared according to exemplary embodiments had substantially low volumetric expansion. As described above, this is because the first addition element included in exemplary embodiments micronizes a silicon single phase uniformly, and thus, the silicon-metal alloy phase acting as a matrix effectively buffers the volumetric expansion of the silicon single phase. Referring to FIG. 7C, according to exemplary embodiments, even after the 50th cycle, the surface of a negative active material did not crack or was not refined, and the thickness of an electrode was 31.8 micrometers. Accordingly, it was confirmed that the thickness of an electrode did not change substantially.

Figure 8:
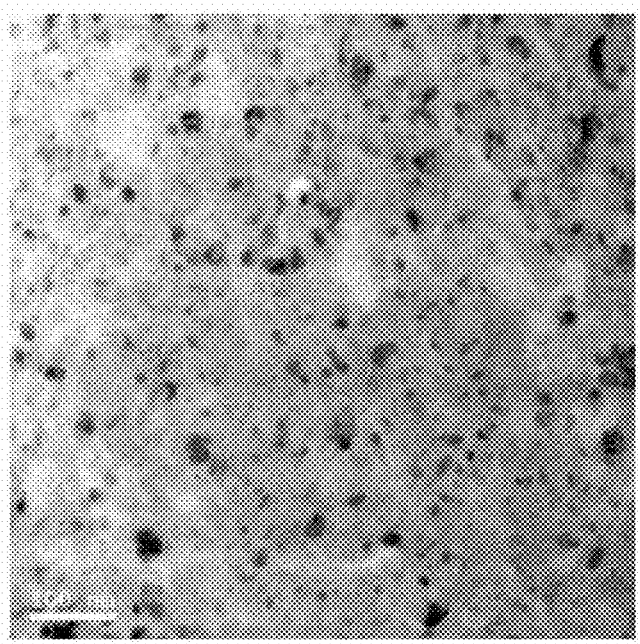
FIG. 8 shows a transmission electron microscope (TEM) image of a negative active material prepared according to Example 2.

FIG. 8 shows a transmission electron microscopy (TEM) image of a negative active material prepared according to Example 2. It was confirmed that the negative active material consisted of a silicon single phase having an average crystal particle diameter of 50 nm or lower and a silicon-metal alloy phase surrounding the silicon single phase.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

In the present disclosure, the terms "Example" and "Comparative Example" are used arbitrarily to simply identify a particular example or experimentation and should not be interpreted as admission of prior art. While one or more exemplary embodiments have been described with reference to the figures, it will be understood by those of ordinary skill in the art that various changes in form and details may be made therein without departing from the spirit and scope as defined by the following claims.

What is claimed is:

1. A negative active material comprising
a silicon single phase; and
a silicon-metal alloy phase interfaced with the silicon single phase and surrounding the silicon single phase,
wherein the negative active material comprises 0 at % of copper (Cu), 10 to 30 at % of iron (Fe), 0.1 to 10 atom (at) % of a first addition element, and 70 to 90 at % of silicon,
wherein the silicon single phase has an average crystal particle diameter of 50 nanometers (nm) or less,
the first addition element is selected from boron, carbon, phosphorous, titanium, chromium, manganese, nickel, zinc, zirconium, niobium, molybdenum, and tin,
an X-ray diffraction spectrum of the negative active material has first and second peaks that are originated from the silicon-metal alloy phase, and the first peak is located at 49.1+/−0.5 degrees (°) and the second peak is located at 38.0+/−0.5 degrees (°), and
a diffraction intensity of the first peak is greater than 1.80 to less than 1.89 times that of the second peak.

2. The negative active material of claim 1, wherein the first peak of the silicon-metal alloy phase is a diffraction peak corresponding to a crystallographic (102) face of a ferrosilicon (FeSi2) phase, and the second peak of the silicon-metal alloy phase is a diffraction peak corresponding to a crystallographic (101) face of the FeSi2 phase.

3. The negative active material of claim 1, wherein a ratio of a diffraction intensity of the first peak to a diffraction intensity of the second peak is in a range of 1.8:1 to 1.9:1.

4. The negative active material of claim 1, wherein the X-ray diffraction spectrum of the negative active material further has a third peak that is originated from the silicon-metal alloy phase, and the third peak is located at 17.3+/−0.5 degrees (°), and
the third peak is a diffraction peak corresponding to a crystallographic (001) face of a ferrosilicon (FeSi2) phase.

5. The negative active material of claim 1, wherein the X-ray diffraction spectrum of the negative active material further has a fourth peak corresponding to a crystallographic (111) face of the silicon single phase, wherein the fourth peak is located at 28.5+/−0.5 degrees (°).

6. The negative active material of claim 1, wherein a ratio of an atomic molar fraction of silicon to the sum of an atomic molar fraction of the iron and an atomic molar fraction of the first addition element is in a range of 3.5 to 4.5.

7. The negative active material of claim 1, wherein the first addition element is selected from Mn, Cr, and Al.

8. The negative active material of claim 1, wherein the negative active material has a specific resistance of 0.2 Ωcm or less, which is measured by applying a compressive load of 4 to 20 kN to the negative active material.

9. The negative active material of claim 1, wherein an electrode comprising the negative active material volumetrically expands to 50% or less of an initial electrode plate thickness, after one charging and after repeated charging and discharging cycles.

10. A negative electrode comprising the negative active material of claim 1.

11. A lithium secondary battery comprising the negative electrode of claim 10.

* * * * *